United States Patent
Fiedler et al.

(10) Patent No.: US 11,341,573 B1
(45) Date of Patent: May 24, 2022

(54) USING VOICE BIOMETRICS FOR TRADE OF FINANCIAL INSTRUMENTS

(71) Applicant: United Services Automobile Association (USAA), San Antonio, TX (US)

(72) Inventors: Kevin K. Fiedler, Boerne, TX (US); Thomas Bret Buckingham, Fair Oaks Ranch, TX (US); Bharat Prasad, San Antonio, TX (US); Charles Lee Oakes, III, Boerne, TX (US); Vijay Jayapalan, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 638 days.

(21) Appl. No.: 15/421,152

(22) Filed: Jan. 31, 2017

Related U.S. Application Data

(60) Provisional application No. 62/291,140, filed on Feb. 4, 2016.

(51) Int. Cl.
| | |
|---|---|
| *G06Q 40/04* | (2012.01) |
| *G10L 25/63* | (2013.01) |
| *G10L 17/22* | (2013.01) |
| *G10L 15/22* | (2006.01) |
| *G10L 15/18* | (2013.01) |
| *G10L 17/00* | (2013.01) |

(52) U.S. Cl.
CPC .......... *G06Q 40/04* (2013.01); *G10L 15/1815* (2013.01); *G10L 15/22* (2013.01); *G10L 17/00* (2013.01); *G10L 17/22* (2013.01); *G10L 25/63* (2013.01); *G10L 2015/223* (2013.01)

(58) Field of Classification Search
CPC .................................................. G06F 3/04817
USPC ................................ 704/205, 206, 207, 208
See application file for complete search history.

(56) References Cited

U.S. PATENT DOCUMENTS

| | | | | | |
|---|---|---|---|---|---|
| 3,215,821 | A | * | 11/1965 | Stenby | .................... G10L 15/00 708/141 |
| 3,573,747 | A | * | 4/1971 | Adams | .................... G06Q 40/04 705/37 |
| 4,158,750 | A | * | 6/1979 | Sakoe | ................. B60R 16/0373 704/251 |

(Continued)

FOREIGN PATENT DOCUMENTS

| | | | | | |
|---|---|---|---|---|---|
| CN | 107592933 | * | 1/2018 | ........... | H04L 9/3239 |
| KR | 20180057167 | * | 5/2018 | | |

*Primary Examiner* — Daniel S Felten
(74) *Attorney, Agent, or Firm* — Fletcher Yoder P.C.

(57) ABSTRACT

Methods, systems, and apparatus, including computer programs encoded on a computer storage medium, for receiving first voice data from a user, receiving behavior data associated with the user, and determining that the user is authentic at least partially based on voice recognition of the first voice data, and behavior analysis of the behavior data, and subsequently: prompting one or more spoken commands from the user, receiving second voice data representative of at least one spoken command of the user to trade at least one financial instrument, providing trade data for executing the trade of the at least one financial instrument, and determining that the trade data is valid at least partially based on the second voice data, and in response, initiating execution of the trade.

17 Claims, 4 Drawing Sheets

(56) References Cited

U.S. PATENT DOCUMENTS

| | | | | |
|---|---|---|---|---|
| 4,264,782 A * | 4/1981 | Konheim | G06Q 20/401 | 340/5.73 |
| 4,319,085 A * | 3/1982 | Welch | G10L 25/87 | 704/237 |
| 4,412,287 A * | 10/1983 | Braddock, III | H04L 12/1804 | 705/37 |
| 4,598,367 A * | 7/1986 | DeFrancesco | G06Q 40/00 | 340/4.5 |
| 4,980,826 A * | 12/1990 | Wagner | G06Q 40/04 | 705/37 |
| 5,297,031 A * | 3/1994 | Gutterman | G06Q 40/04 | 705/37 |
| 5,497,317 A * | 3/1996 | Hawkins | G06Q 40/04 | 705/37 |
| 6,252,869 B1 * | 6/2001 | Silverman | H04L 63/18 | 370/352 |
| 7,389,917 B2 * | 6/2008 | Abraham | G06Q 20/204 | 235/382 |
| 7,490,242 B2 * | 2/2009 | Torres | H04L 63/0815 | 380/281 |
| 9,185,095 B1 * | 11/2015 | Moritz | H04L 63/102 | |
| 9,547,874 B2 * | 1/2017 | Gorelik | G06Q 40/06 | |
| 9,612,715 B2 * | 4/2017 | Gambhir | G06F 3/0481 | |
| 10,013,983 B1 * | 7/2018 | Johnson | G10L 17/22 | |
| 10,129,252 B1 * | 11/2018 | Suen | H04L 63/0861 | |
| 10,310,705 B2 * | 6/2019 | Xing | G06F 3/0482 | |
| 2004/0006532 A1 * | 1/2004 | Lawrence | H04L 29/12009 | 705/38 |
| 2011/0302083 A1 * | 12/2011 | Bhinder | G06Q 20/32 | 705/44 |
| 2013/0080166 A1 * | 3/2013 | Buffum | G06F 21/32 | 704/236 |
| 2014/0330694 A1 * | 11/2014 | Barker | G06Q 40/04 | 705/37 |
| 2017/0142465 A1 * | 5/2017 | Ray | H04N 21/2668 | |
| 2018/0300526 A1 * | 10/2018 | Cho | G06K 9/00919 | |
| 2020/0394709 A1 * | 12/2020 | Cella | G06N 3/0427 | |
| 2021/0105358 A1 * | 4/2021 | Jolly | G10L 17/06 | |

* cited by examiner

USING VOICE BIOMETRICS FOR TRADE OF FINANCIAL INSTRUMENTS

CROSS-REFERENCE TO RELATED APPLICATION

This application claims priority to U.S. Provisional Application Ser. No. 62/291,140, filed on Feb. 4, 2016, the entirety of which is incorporated herein.

BACKGROUND

Service providers provide a variety of channels to enable customers to perform transactions. For example, financial service providers provide in-person, telephone, and network-based channels to enable customers to access financial information (e.g., retrieve account information), and/or conduct transactions (e.g., trading financial instruments). In the in-person context, a representative of the service provider directly meets with a customer to counsel the customer (e.g., retirement planning), to provide financial information to the customer (e.g., stock quotes), and/or to execute financial transactions for the customer (e.g., buy/sell stocks). Other channels can be provided to enable more efficient, cost-effective customer interactions. For example, service providers must hire and train representatives for in-person and telephone transactions, which incurs cost.

In some examples, financial service providers enable customers to access financial information by telephone and/or through websites. In the telephone context, a customer can call the service provider and talk to a representative. This can incur similar costs as discussed above with respect to the in-person context. Further, a series of security questions can be required in order to authenticate the customer to the representative. In the telephone context, one or more messages can be played to the customer, which describe various options available to the customer. For example, the customer can select options by depressing "buttons" on a telephone touch pad (e.g., physical, virtual displayed on a screen). For example, a data tone multiple frequency (DTMF) can be used to navigate through menus and/or options. Although this may be more efficient than a representative directly interacting with a customer, there are disadvantages. For example, using a telephone touch pad can be tedious and inefficient for the customer. As another example, the customer must be authenticated to the automated system. In the network-based context, the customer can log into a system of the service provider through a web page (e.g., a web portal). Again, the customer must be authenticated to the system.

In some examples, authentication in both the telephone context and network-based context can be spoofed (e.g., a malicious user is able to authenticate as the customer). For example, customer information used to authenticate the customer can be static information, which can be susceptible to discovery by non-authorized users (e.g., hackers).

SUMMARY

Implementations of the present disclosure are generally directed to authenticating users to trade financial instruments. More particularly, implementations of the present disclosure are directed to using dynamic information to authenticate a user for conducting trades in financial instruments.

In general, innovative aspects of the subject matter described in this specification can be embodied in methods that include actions of receiving first voice data from a user, receiving behavior data associated with the user, and determining that the user is authentic at least partially based on voice recognition of the first voice data, and behavior analysis of the behavior data, and subsequently: prompting one or more spoken commands from the user, receiving second voice data representative of at least one spoken command of the user to trade at least one financial instrument, providing trade data for executing the trade of the at least one financial instrument, and determining that the trade data is valid at least partially based on the second voice data, and in response, initiating execution of the trade. Other implementations of this aspect include corresponding systems, apparatus, and computer programs, configured to perform the actions of the methods, encoded on computer storage devices.

These and other implementations can each optionally include one or more of the following features: determining that the user is authentic at least partially includes determining that a current behavior pattern is sufficiently similar to a known behavior pattern; determining that the user is authentic at least partially includes determining that a current behavior pattern is not sufficiently similar to a known behavior pattern, and that at least one feature of the current behavior pattern corresponds to context data associated with the user; actions further include receiving context data representative of a context associated with one or more of the first voice data and the second voice data, the context data being provided from one or more of a public context source, a private context source, and a device being used by the user; each of the public context source and the private context source includes one of a computer-implemented search service, a computer-implemented stock quoting service, and a computer-implemented social networking service; determining that the user is authentic includes determining that a sentiment of the user corresponds to an alert sentiment, and in response, determining that the user is authentic based on a second-level of authentication; the second-level of authentication includes prompting the user for authentication data, the user being authenticated based on the authentication data; determining that the trade data is valid at least partially based on the second voice data includes determining that the user is authentic at least partially based on voice recognition of the second voice data; the second voice data includes data indicative of one or more of a type of financial instrument to be traded, a number of shares to be traded, a sale of the financial instrument, a purchase of the financial instrument, and a time and/or date for executing the trade; and actions further include determining that an integrity of ground-truth data used for authenticating the user is intact based on querying a distributed ledger system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are directed to authenticating users to trade financial instruments. More particularly, implementations of the present disclosure are directed to using dynamic information to authenticate a user for conducting trades in financial instruments. Implementations include receiving first voice data from a user, receiving behavior data associated with the user, and determining that the user is authentic at least partially based on voice recognition of the first voice data, and behavior analysis of the behavior data, and subsequently: prompting one or more spoken commands from the user, receiving second voice data representative of at least one spoken command of the user to trade at least one financial instrument, providing trade data for executing the trade of the at least one financial instrument, and determining that the trade data is valid at least partially based on the second voice data, and in response, initiating execution of the trade.

Figure 1:
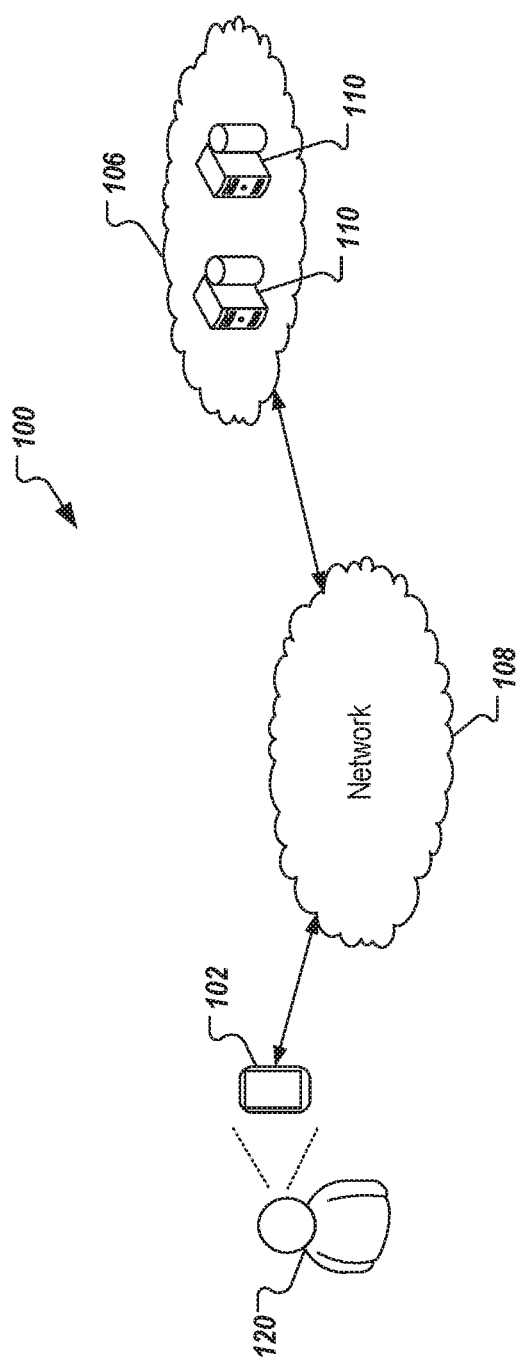
FIG. 1 depicts an example environment in accordance with implementations of the present disclosure.

FIG. 1 depicts an example environment 100, in which implementations of the present disclosure can be provided. The example environment 100 includes a client-side device 102, a server-side system 106, and a network 108. In some examples, the client-side device 102 and at least one component of the server-side system 106 communicate with each other over the network 108. In some examples, the network 108 includes a large computer network, such as a local area network (LAN), a wide area network (WAN), the Internet, a cellular network, a telephone network, or any appropriate combination thereof connecting any number of devices and/or server systems.

In some implementations, the server-side system 106 includes at least one server system 110. An example server system 110 includes at least one server and at least one datastore (e.g., database). In some implementations, the server-side system 106 provides, among other functionality, user authentication, and financial instrument trade execution, as described in further detail herein. For example, a user 120 can use the client-side device 102 to interact with the server-side system 106, where the user 120 can be authenticated by the server-side system 106, and can execute a trade of a financial instrument.

In some implementations, the client-side device 102 enables the user 120 to verbally interact with the server-side system 106 over the network 108. In some examples, the client-side device 102 includes a computing device. Example computing devices can include a smartphone, a personal digital assistant (PDA), a desktop computer, a laptop computer, and a smart speaker. Example smart speakers can include Amazon Echo provided by Amazon.com, Inc. of Seattle, Wash., and Google Home provided by Google Inc. of Mountain View, Calif. In some examples, the client-side device 102 includes a telephone. For example, and in accordance with implementations of the present disclosure, the user 120 can speak into the client-side device 102, which provides voice data based on the speech, the voice data being transmitted over the network 108 to the server-side system 106, which processes the voice data to authenticate the user 120, and/or to execute at least one trade of a financial instrument. In some implementations, context data can be provided to the server-side system 106, which can perform user authentication, and/or execution of at least one trade of a financial instrument further based on the context data (in addition to the voice data). Example context data can be provided from the client-side device 102, and/or at least one other context source, as described in further detail herein.

In some implementations, the server-side system 106, and the functionality provided thereby, is provided by a service provider. In some examples, the service provider provides financial services to customers (users). In the context of the present disclosure, service providers can include financial service providers. Example service providers can include banks, credit card companies, brokerage companies (e.g., trading companies), and the like.

As introduced above, implementations of the present disclosure are directed to authenticating users to trade financial instruments. More particularly, implementations of the present disclosure are directed to using dynamic information to authenticate a user for conducting trades in financial instruments. In some examples, implementations of the present disclosure are based on voice interaction of a user (e.g., a customer) with a computer-implemented trading system (e.g., automated trading system).

In accordance with implementations of the present disclosure, a user is authenticated to conduct a trade of a financial instrument based on static information and dynamic information. In some implementations, a user is authenticated based on two or more of speech recognition, voice recognition (voice biometric), a sentiment, a behavior, and a context. In some examples, the user can be prompted for a second-level of authentication based on the two or more of the speech recognition, the voice recognition (voice biometric), the sentiment, the behavior, and the context. In some examples, options that may be available for the user to interact with a computer-implemented system can be based on the context.

With regard to speech recognition, voice data can be processed to identify letters, number, words, and/or phrases that were spoken by the user. In some examples, speech recognition is independent of the particular speaker (e.g., content of the speech can be recognized regardless of who is speaking). In the context of the present disclosure, the user can speak an account number "1234ABCD," that is captured in the voice data, and the voice data can be processed to provide the text "1234ABCD." In other words, speech is converted into computer-readable text (e.g., a text string).

In some examples, speech recognition can be performed using one or more conventional speech recognition techniques. For example, the voice data can be divided into segments, and each segment can be matched to a known phoneme (a distinct unit of sound in a particular language), the matched phonemes are examined in the context of one another to provide a contextual phoneme plot, which can be compared to a library of known letters, numbers, words, phrases, and/or sentences, and a matching letters and/or numbers, in the context of the present disclosure, are output as text data (e.g., representing a spoken account number). In some examples, and as described in further detail herein, the text provided from the speech is used as a static authentication factor. In some examples, the speech recognition provides a mechanism for non-intrusiveness (i.e., customer does not have to actively authenticate to conduct business; transparent (to the user) authentication is provided).

In some examples, after the user is authenticated (e.g., partially based on speech recognition), speech recognition continues to be used to enable the user to further interact with the system. For example, in response to determining that the use is authentic, the system can audibly convey at least one option (e.g., a menu of options) to the user, or otherwise make a request of the user, and the user can verbally select an option. For example, if the user is determined to be authentic, the system can respond "How can we help you today?," which is audibly conveyed to the user through the computing device (e.g., smartphone, telephone). As another example, if the user is determined to be authentic, the system can respond "Please state one of the following options: account information, financial planner, conduct a trade, speak to a human, help," which is audibly conveyed to the user through the computing device (e.g., smartphone, telephone).

In some examples, the user provides a verbal reply to the system, which verbal reply is processed using speech recognition, as described herein. For example, the user can reply "conduct a trade," which is converted to voice data that is processed using speech recognition to provide a computer-readable text string. The user and system can interact to progress through a workflow based on verbal/audible interactions. For example, the user can progress through a trade workflow to execute a trade of a financial instrument in accordance with implementations of the present disclosure. In this example, in response to the user stating "conduct a trade," the following example interactions can occur based on speech recognition:

System: Would you like to trade a stock?
User: Yes
System: Which stock would you like to trade?
User: XYZ
(system determines that the user already owns shares of XYZ)
System: Would you like to buy or sell shares of XYZ?
User: Sell
System: How many shares would you like to sell?
User: Fifty The example interactions can continue through the user confirming the trade to initiate execution of the trade. In some examples, user authentication can again be required to actually execute the trade. For example, the user can again be authenticated, as described herein, before the requested trade is acted upon.

With regard to voice recognition, the voice data can be processed to determine who is speaking. In some examples, the voice data is processed to provide a voice pattern (also referred to as a voiceprint), which can be compared to one or more known voice patterns to determine who is speaking. A voice is a unique identifier of a particular user (arguably as unique as a fingerprint), because voice is at least partially based on the shape of the vocal cavities of the particular speaker, and the way the particular speaker moves their mouth when speaking.

In some examples, a voice pattern of the user is provided each time the user verbally interacts with a system of a service provider. In some examples, multiple voice patterns, each voice pattern corresponding to a respective verbal interaction of the user, are combined to provide the user-specific voice pattern. For example, the user verbally interacts with a computer-implemented system several times, and each time states an account number. Each recitation of the account number provides respective voice data that can be used to provide a respective voice pattern for the particular user.

In some examples, the voice pattern is based on a sound spectrogram, which includes a graph that plots a frequency (on the vertical axis) over time (on the horizontal axis). In some examples, different speech sounds create different shapes within the spectrogram. A known voice pattern can be stored in computer-readable memory, and can represent a ground-truth voice pattern for a particular user. Subsequent speech of a user can be used to provide a voice pattern that can be compared to the known voice pattern. If the voice pattern sufficiently matches the known voice pattern, the user can be at least partially authenticated. That is, the user may be determined to be authentic (i.e., the user is determined to be who they purport to be) from the perspective of voice recognition, but a full authentication may depend on additional authentication perspectives, in accordance with implementations of the present disclosure.

In some examples, voice patterns can be compared based on a dot product 219 of the respective vectors. For example, a current vector of a voice pattern can be provided based on voice data currently received by a system (e.g., a user has called in and spoken to the system). A known vector of a known voice pattern (e.g., stored in computer-readable memory) can be compared to the current vector based on a dot product 219. In some examples, the dot product results in a value being provided, the value indicating a degree of difference between the current vector and the known vector. In some examples, the value can range between −1 and 1. For example, if the resultant value of the dot product is 1, the vectors, and thus the underlying speaker, are determined to be identical, and if the dot product is −1, the vectors, and thus the underlying speaker, are determined not to be the same. In some examples, a threshold can be provided, such that, if the resultant value of the dot product exceeds the threshold, the vectors are determined to be sufficiently similar to determine that the user is authentic.

In some examples, the voice pattern is dynamic, because a user's voice can change over time. In some examples, a user's voice changes with age, as, for example, the shape of their vocal cavities, and/or the way their mouth moves when speaking changes over time. As another example, a smoker's voice may become hoarser over time. Consequently, voice recognition (voice biometrics) is a dynamic authentication factor. In some examples, the voice pattern provides a mechanism for non-intrusiveness (i.e., customer does not have to actively authenticate to conduct business; transparent (to the user) authentication is provided).

In some implementations, a behavior pattern of the user can be developed based on user interactions with the service provider. In some examples, user behavior (a dynamic factor) can be used to profile the user in view of the behavior pattern. In some implementations, the behavior pattern can be used to identify anomalous behavior (e.g., customer normally trades particular type of stock from home from 2-4 PM; current trade request is different type of stock, not from home, at 9 AM).

In some examples, and as described in further detail herein, the behavior pattern can include a plurality of features that represent a user's behavior. Example features can include types of financial instruments traded by user, types of transactions executed by the user, times/days on which the user trades financial instruments, the channel(s) the user uses to interact with the service provider, and the like. In some examples, sets of features can be provided, each set of features being representative of a respective behavior. In some examples, each set of features can include a respective weight. In some examples, the weight can be based on a frequency, at which the particular behavior is observed from the particular user.

By way of non-limiting example, an example user can have three example behavior patterns associated therewith. A first behavior pattern provides that the user trades stocks on Friday at 2 PM (user local time) using a particular desktop computer, and can be associated with a first weight. A second behavior pattern provides that the user transfers funds from a savings account to a checking account each month using the particular desktop computer, and can be associated with a second weight. A third behavior pattern provides that the user purchases a particular stock semi-annually using a particular laptop computer, and can be associated with a third weight. In some examples, the first weight is greater than the second weight, and the second weight is greater than the third weight. Consequently, the first behavior pattern occurs more often than the second behavior pattern, and the second behavior pattern occurs more often than the third behavior pattern.

In some implementations, a current behavior pattern can be compared to one or more known behavior patterns (e.g., the first, second, third example behavior patterns discussed above). In some examples, each known behavior pattern can be a ground-truth behavior pattern for the particular user. In some examples, if the current behavior pattern matches a known behavior pattern, the user can be at least partially authenticated. That is, the user may be determined to be authentic (i.e., the user is determined to be who they purport to be) from the perspective of behavior recognition, but a full authentication may depend on additional authentication perspectives, in accordance with implementations of the present disclosure. In some examples, if the current behavior pattern does not match a known behavior pattern, the user's current behavior can be determined to be anomalous, and a second level of authentication can be initiated.

In some examples, each behavior pattern can be provided as a multi-dimensional vector that is representative of an underlying behavior of the user. In some examples, behavior patterns can be compared based on a dot product 225 of the respective vectors. For example, a current vector of a behavior pattern can be provided based on behavior information currently received by a system (e.g., a user has called in using a particular device, at a particular time on a particular day, and has requested trade of a particular stock). A known vector of each of a plurality of known behavior patterns (e.g., stored in computer-readable memory) can be compared to the current vector based on a dot product.

In some examples, and for multiple known behavior patterns, an order of comparison can be provided based on the respective weights assigned to the respective known behavior patterns. For example, a known vector for a known behavior pattern having a higher weight can be compared to the current vector before a known vector for a known behavior pattern having a lower weight. For example, and with reference to the example above, a current vector would first be compared to a known vector for the first behavior pattern, the current vector would next be compared to a known vector for the second behavior pattern (e.g., if the current vector is not sufficiently similar to the known vector of the first behavior pattern), and the current vector would finally be compared to a known vector for the third behavior pattern (e.g., if the current vector is not sufficiently similar to the known vector of the second behavior pattern). In some examples, if the current vector is sufficiently similar to a known behavior pattern, the user's current behavior is determined not to be anomalous. In some examples, if the current vector is sufficiently similar to a known behavior pattern in an order of known behavior patterns to be compared, and there are still at least one subsequent known behavior pattern in the order that has not yet been compared, comparison is halted, such that a comparison of the at least one subsequent known behavior pattern in the order is not performed. In this manner, computing resources (e.g., memory, processing power) are conserved.

In some examples, and with respect to comparing, the dot product results in a value being provided, the value indicating a degree of difference between the current vector and the known vector. In some examples, the value can range between −1 and 1. For example, if the resultant value of the dot product is 1, the vectors, and thus the underlying behavior, are determined to be identical, and if the dot product is −1, the vectors, and thus the underlying behavior, are determined not to be the same. In some examples, a threshold can be provided, such that, if the resultant value of the dot product exceeds the threshold, the vectors, and thus the underlying behavior, are determined to be sufficiently similar to determine that the behavior is not anomalous.

In some examples, the behavior pattern(s) is/are dynamic. That is, for example, user behavior can change over time. For example, if a user's wealth grows over time, the frequency of investment activity may also increase. In some examples, the behavior pattern provides mechanism for non-intrusiveness (i.e., customer does not have to actively authenticate to conduct business; transparent (to the user) authentication is provided).

In some implementations, a sentiment analysis is provided for verbal interactions between the user and systems of the service provider. In some examples, the sentiment analysis identifies at least one sentiment to a verbal interaction. Example sentiments include happy, sad, angry, hurried, tired, intoxicated, calm, alert, anxious. In some examples, sentiment data can be provided for a verbal interaction. In some implementations, sentiment analysis can be performed on the voice data and can include natural language processing, text analysis, and/or computational linguistics to identify and extract one or more sentiments (subjective information) from the voice data.

In some implementations, context data can be used to authenticate the user. In some examples, context data can be received from at least one context source. Example context sources include a device that the user is using to interact with the system, public context sources, private context sources, and anonymized context sources. In some implementations, context data can be provided during a verbal interaction. In some implementations, the context data can be used to authenticate the user. In some implementations, the context data can be used in combination with speech recognition, a voice pattern, a behavior pattern, and/or a sentiment to authenticate the user.

Example context data can include a date, a time, a unique identifier of a device that the user is using to interact with the system, an activity conducted by the user, a current location of the user, and the like. In some examples, the context data can be provided from the device that the user is using to interact with the system. For example, a user can instantiate a session with the system (e.g., log into the system through a web portal provided using a web browser executed on the device, or a mobile application executed on the device). In some examples, the unique identifier associated with the device can be provided from the device as part of a protocol for instantiating the session. In some examples, context data is provided with the voice data (e.g., the context data is provided as metadata that is appended to the voice data).

In some examples, the context data is provided as public information available from a computer-implemented service used by the user. An example computer-implemented service can include a social networking service that the user uses to post digital content (e.g., status updates) that are publicly viewable. For example, the user can use the social networking service to post comments on particular stocks and/or companies that the user is interested in, which posts are publicly available. This social network activity can be provided as context data, which can be used to authenticate the user during a trade of a financial instrument. For example, the fact that the user had posted about the particular stock, and is now requesting a trade of that stock can contribute to confirmation of the authentication of the user for executing the trade.

In some implementations, context data can be requested from a computer-implemented service. In some examples, the context data can be requested in response to a user request to conduct a trade of a financial instrument. In some examples, the request can include submitting a request through an application programming interface (API) of the computer-implemented service. For example, in response to the user requesting a trade of the stock XYZ, a request can be sent to a social networking service through the API of the social networking service, and can request any post that includes the stock XYZ (e.g., and/or the company underlying the stock) for the particular user, and the social networking service can provide public information, if available, that matches the request. An example response can include a data set representative of a post posted by the user on a particular date/time and including the example text "Going to buy me some XYZ tonight!"

In some examples, the context data is provided from a private context source. For example, the user can interact with the system to research stock prices, the search activity of the user only being known to the system, and not being otherwise public. In some examples, the user submits a query to the system requesting a current stock price for a particular stock. This search activity (e.g., which is only available to the system) can be provided as context data, which can be used to authenticate the user during a trade of a financial instrument. For example, the fact that the user had been searching for the particular stock, and is now requesting a trade of that stock can contribute to confirmation of the authentication of the user for executing the trade.

In some examples, private context data can be provided from a computer-implemented service that the user interacts with. For example, the user can interact with at least one computer-implemented service that is provided by a third-party service provider. Examples of such computer-implemented services include a social networking service, and a search service. In some examples, user interactions with third-party computer-implemented services may generally be private (e.g., not shared with outside of the computer-implemented service). In some implementations, the user can indicate that their interactions with a third-party computer-implemented can be shared with the system of the financial service provider. For example, the user can manage a privacy setting of the third-party computer-implemented service to allow the system of the financial service provider access to otherwise private context data.

For example, the user can interact with a third-party search system (e.g., a search engine) to research stock prices, the search activity of the user only being known to the third-party search system, and not being otherwise public. In some examples, the user submits a query to the third-party search system requesting a current stock price for a particular stock. Also, the user can use a social networking service to post comments on particular stocks and/or companies that the user is interested in, which posts are not publicly available (e.g., the post is limited to a select number of contacts within the social networking service. The search activity (e.g., which is only available to the third-party search system) and the social networking activity (e.g., which is only available to the social networking service) can both be provided as private context data, which can be used to authenticate the user during a trade of a financial instrument. For example, the fact that the user had been searching for the particular stock, and is now requesting a trade of that stock can contribute to confirmation of the authentication of the user for executing the trade. As another example, the fact that the user had posted about the particular stock, and is now requesting a trade of that stock can contribute to confirmation of the authentication of the user for executing the trade.

In some implementations, private context data can be requested from a computer-implemented service. In some examples, the private context data can be requested in response to a user request to conduct a trade of a financial instrument. In some examples, the request can include submitting a request through an API of the computer-implemented service. For example, in response to the user requesting a trade of the stock XYZ, a request can be sent to a social networking service through the API of the social networking service, and can request any post that includes the stock XYZ (e.g., and/or the company underlying the stock) for the particular user, and the social networking service can provide public information, as well as private information, if available, that matches the request. An example response can include a data set representative of a post posted by the user on a particular date/time and including the example text "Going to buy me some XYZ tonight!," which the user had posted to a private group of contacts within the social networking service. As another example, in response to the user requesting a trade of the stock XYZ, a request can be sent to a third-party search service through the API of the search service, and can request any search activity that includes the stock XYZ (e.g., and/or the company underlying the stock) for the particular user, and the search service can provide private information, if available, that matches the request. An example response can include a data set representative of a query submitted by the user and/or interactions with search results on a particular date/time and including the example query [current price of XYZ stock], which the user had submitted to the search system.

In some examples, public context data can be provided from a public context source. Example public context sources can include third-party computer-implemented services. Example third-party computer-implemented services can include a search service, a social networking service, a stock quoting service. For example, users can interact with a search service to submit search queries and receive search results. In some examples, the search service provides publicly available information related to queries submitted by and/or search results interacted with by users of the search service. Example publicly available information can include a frequency, at which a particular search query has submitted (e.g., trending queries). As another example, users can interact with a social networking service to post content to other users of the social networking service. In some examples, the social networking service provides publicly available information related to posts submitted by and/or interacted with by users of the social networking service. Example publicly available information can include a frequency, at which a particular topic is mentioned in posts (e.g., trending topics). As another example, users can interact with a stock quoting service to retrieve stock quotes. In some examples, the stock quoting service provides publicly available information related to queries submitted by and/or stock quote results interacted with by users of the stock quoting service. Example publicly available information can include a frequency, at which a particular stock quote is requested (e.g., trending stocks). Accordingly, public context information can include anomalized and/or aggregate information provided from computer-implemented services.

In some implementations, public context data can be requested from a computer-implemented service. In some examples, the public context data can be requested in response to a user request to conduct a trade of a financial instrument. In some examples, the request can include submitting a request through an API of the computer-implemented service. For example, in response to the user requesting a trade of the stock XYZ, a request can be sent to a social networking service through the API of the social networking service, and can request statistics on the stock XYZ (e.g., and/or the company underlying the stock), if available, that matches the request. An example response can include a data set representative of a frequency, at which the stock XYZ (e.g., and/or the company underlying the stock) is mentioned across the social networking service. As another example, in response to the user requesting a trade of the stock XYZ, a request can be sent to a third-party search service through the API of the search service, and can request statistics for search activity relating to the stock XYZ (e.g., and/or the company underlying the stock). An example response can include a data set representative of a frequency, at which queries related to the stock XYZ (e.g., and/or the company underlying the stock) submitted by users of the search service. As another example, in response to the user requesting a trade of the stock XYZ, a request can be sent to a third-party stock quoting service through the API of the stock quoting service, and can request statistics for stock quote activity relating to the stock XYZ (e.g., and/or the company underlying the stock). An example response can include a data set representative of a frequency, at which queries related to the stock XYZ (e.g., and/or the company underlying the stock) submitted by users of the stock quoting service.

As introduced above, and in accordance with implementations of the present disclosure, a user is authenticated to conduct a trade of a financial instrument based on static information and dynamic information. In some implementations, a user is authenticated based on two or more of speech recognition, voice recognition (voice biometric), a sentiment, a behavior, and a context. In some examples, the user can be prompted for a second-level of authentication based on the two or more of the speech recognition, the voice recognition (voice biometric), the sentiment, the behavior, and the context.

In some implementations, the user is authenticated based on two factors, the recited name and/or account number (static factors) being correct, and the current voice pattern (a dynamic factor) sufficiently matching the stored (known) voice pattern. That is, for example, speech recognition can be used to determine a name and an account number recited by the user. In some examples, the recited account number can be compared to a known account number associated with the recited name, and/or the recited name can be compared to a known name associated with the recited account number. For example, the recited name can be used to look-up a known account number associated with the name in a database, and/or the recited account number can be used to look-up a known name associated with the account number in the database. If the recited account number matches the known account number, and/or the recited name matches the known name, the authentication factor(s) is/are deemed to be correct. If the recited account number does not match the known account number, and/or the recited name does not match the known name, the authentication factor(s) is/are deemed to be incorrect.

Voice recognition is used to determine whether the voice underlying the voice data sufficiently corresponds to the user (e.g., based on the example dot product determination described herein). If the voice sufficiently correspond to the known voice of the user (e.g., the dot product value exceeds the threshold), that authentication factor is deemed to be correct. If the voice does not sufficiently correspond to the known voice of the user (e.g., the dot product value does not exceed the threshold), that authentication factor is deemed to be incorrect.

In some implementations, if the recited account number is correct and/or the recited name is correct, and the current voice pattern sufficiently matches the stored (known) voice pattern (e.g., is correct), the user is authenticated and is able to conduct the requested trade. In some implementations, if the recited account number is incorrect, the recited name is incorrect, and/or the current voice pattern does not sufficiently match the stored (known) voice pattern (e.g., is incorrect), the user is not authenticated and is unable to conduct the requested trade. In some examples, if the recited account number is incorrect, and/or the current voice pattern does not sufficiently match the stored (known) voice pattern (e.g., is incorrect), a second-level of authentication is conducted in an effort to authenticate the user. For example, the user can be requested to provide additional authentication data (e.g., username/password, personal identification number (PIN)).

In some implementations, the behavior pattern can be used to authenticate the user. For example the behavior pattern can be used in combination with speech recognition and/or voice pattern to authenticate the user. In some examples, the behavior pattern is used as a third authentication factor. For example, if the recited account number is correct, the current voice pattern sufficiently matches the stored (known) voice pattern (e.g., is correct), and the current behavior pattern sufficiently matches a stored (known) behavior pattern, the user is authenticated and is able to conduct the requested trade. In some implementations, if the recited account number is incorrect, the current voice pattern does not sufficiently match the stored (known) voice pattern (e.g., is incorrect), and/or the current behavior pattern does not sufficiently match a stored (known) behavior pattern (e.g., the current behavior is anomalous), the user is not authenticated and is unable to conduct the requested trade. In some examples, if the recited account number is incorrect, and/or the current voice pattern does not sufficiently match the stored (known) voice pattern (e.g., is incorrect), but the current behavior pattern does not sufficiently match a stored (known) behavior pattern (e.g., the current behavior is anomalous), the second-level of authentication is conducted in an effort to authenticate the user. For example, the user can be requested to provide additional authentication data (e.g., username/password, PIN). In this manner, although the user is out-of-pattern, the user can still be authenticated.

In some implementations, the sentiment can be used in combination with other authentication factors to authenticate the user. In some examples, a sentiment analysis is provided to identify at least one sentiment to a verbal interaction. Example sentiments include happy, sad, angry, hurried, tired, calm, intoxicated, alert, anxious. In some examples, if the sentiment corresponds to at least one alert sentiment, the second-level of authentication is conducted in an effort to authenticate the user, even though other authentication factors (e.g., voice biometrics, speech recognition, behavior patter) otherwise indicate that the user is authentic. An alert sentiment can include a sentiment that may indicate that there is something amiss with the user and/or that the user is not authenticate. Example alert sentiments can include sad, angry, hurried, intoxicated, and anxious, among others.

In some implementations, the sentiment can be included as part of another authentication factor. In some examples, the sentiment can be included as a feature of a behavior pattern. An example behavior pattern can provide that the user trades stocks on Friday at 6 AM (user local time) using a particular desktop computer, and the user is tired.

In some implementations, the context data can be used in combination with other authentication factors to authenticate the user. For example, if the current context does not sufficiently match a known context, even though other authentication factors may indicate that the user is authentic, the second-level of authentication is conducted in an effort to authenticate the user.

In some implementations, an authentication score can be determined based on the two or more authentication factors, and can be compared to a threshold authentication score to determine whether the user is authentic (e.g., who they purport to be). In some examples, a sub-score is determined for each authentication factor, and the authentication score is determined based on the sub-scores. In some examples, the authentication score is determined as a sum of the sub-scores. In some examples, the authentication score is determined as a weighted sum of the sub-scores, where each sub-score is associated with a respective weight. In some examples, the authentication score is determined as an average of the sub-scores. In some examples, the authentication score is determined as a weighted average of the sub-scores, where each sub-score is associated with a respective weight. In some examples, each sub-score can include a value that is provided within a specified range (e.g., −1 to 1). For example, and with respect to authentication factors being evaluated based on vector comparisons, a respective sub-score can be provided as the value (e.g., ranging from −1 to 1) resulting from the dot product of a current vector and a known vector. As another example, and with respect to authentication factors being discrete text, a respective sub-score can be provided as a value depending on whether the text matches another text. For example, and with respect to sentiment, if the sentiment does not match an alert sentiment, a respective sub-score can be set equal to a first value (e.g., 1), and if the sentiment matches an alert sentiment, the respective sub-score can be set equal to a second value (e.g., −1).

In some examples, if the authentication score exceeds the authentication score threshold, the user is authenticated, and is able to proceed with the trade of the financial instrument. In some examples, if the authentication score does not exceed the authentication score threshold, the user is not authenticated and is unable to proceed with the trade of the financial instrument, or the second-level of authentication is conducted in a continued effort to authenticate the user. In some examples, if at least one sub-score exceeds a minimum value, the user is not authenticated (e.g., even if the authentication score exceeds the threshold authentication score). For example, if the authentication score exceeds the threshold authentication score, but the sub-score associated with voice recognition does not exceed a respective threshold sub-score, the user is not authenticated and is unable to proceed with the trade of the financial instrument, or the second-level of authentication is conducted in a continued effort to authenticate the user.

In some implementations, a menu of available actions that the user can perform is adjusted based on behavior pattern and/or context data. For example, context data can indicate whether a market that the user trades in (e.g., determined from at least one known behavior pattern) is open for trading. If the market is not open for trading, an option to trade in that market is not provided to the user. If the market is open for trading, an option to trade in that market is provided to the user.

Implementations of the present disclosure also provide for predictive actions based on behavior pattern and/or context data. More particularly, implementations of the present disclosure can determine at least one action that the user is likely to want to perform, and can proactively present the action to the user. For example, a behavior pattern and associated weight can indicate that the user often trades (e.g., buys, sells) shares of ABC mutual funds once a month, and context data can indicate that the user has not yet traded shares of ABC mutual funds this month. In response, the financial trading system can proactively ask the user "Would you like to trade shares of ABC today?" In some examples, if the user responds "Yes," a workflow can be initiated to execute a trade of the shares (e.g., confirm whether to buy or sell, confirm the number of shares, confirm a time/date (or other trigger) for executing the trade, execute the trade). In some examples, if the user responds "No," a default workflow can be initiated (e.g., the financial trading system can ask the user "How can we help you today?"). In some examples, by proactively presenting actions to the user time and resources (e.g., computing power, memory) can be spared. For example, instead of starting at the beginning of a default workflow to drill down to the user executing a trade of a particular stock, which requires time and resources to accomplish, the user can start at a trade workflow with at least some information associated with the trade already having been determined (e.g., the name of the shares to be traded).

In some implementations, real-time analysis can be provided to modify trade instructions from the user. For example, the trade data can indicate that the user has requested 100 shares to be purchased. However, it can be determined that only 50 shares are available on the market. Consequently, the system can audibly inform the user that only 50 shares are available, and can request whether the user would like to purchase 50 shares instead of the 100 shares requested.

Implementations of the present disclosure also include interaction with a distributed ledger system to validate information being used to authenticate the user, for example. In some examples, user interactions with the system(s) of the financial service provider and/or known patterns (e.g., voice, behavior) can be recorded in at least one blockchain maintained by a distributed ledger system. In some examples, information (e.g., known patterns, context data) can be validated using a cryptographic blockchain infrastructure (blockchain) of the distributed ledger system before being used to authenticate the user. In some implementations, the blockchain is an existing blockchain that is accessed by various networks. An example blockchain can include the Bitcoin blockchain. In some implementations, the blockchain is an application-specific blockchain (e.g., a blockchain that is dedicated to authenticating users of the financial service provider).

To provide further context for the present disclosure, a high-level discussion of blockchain technology is provided.

In general, a blockchain is a public ledger of all transactions that have ever been executed in one or more contexts (e.g., negotiable instrument transactions, digital currency transactions). A blockchain constantly grows as completed blocks are added with a new set of transactions. In some examples, a single block is provided from multiple transactions (e.g., multiple trades executed by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., trades of stocks). Each node maintains a copy of the blockchain, which is automatically downloaded to the node upon joining the peer-to-peer network. A blockchain protocol provides a secure and reliable method of updating the blockchain, copies of which are distributed across the peer-to-peer network, without the need for a central authority.

Because all users (e.g., financial service providers) need to know all previous transactions (e.g., stock trades) to validate a requested transaction (e.g., stock trade), all users must agree on which transactions have actually occurred, and in which order. That is, all users must come to a consensus. For example, if two users observe different transaction histories, they will be unable to come to the same conclusion regarding the validity of a transaction. In some examples, all users agree on the same rules used to validate transactions (e.g., as provided in the blockchain protocol), thus coming to a consensus. In some examples, a blockchain enables all users to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult (e.g., mathematically, computationally) for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (a random number used only once).

As introduced above, multiple nodes compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to be created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful, and all other miners accept that block as valid), and all copies of the blockchain are updated across the peer-to-peer network to append the block to the blockchain. Each miner may be required to produce hundreds or thousands (or even millions, billions, or trillions) of hash values, before any one miner provides a qualifying hash value.

In some cases, the distributed ledger system can include one or more sidechains. A sidechain can be described as a blockchain that references data from other blockchains. In some examples, a sidechain enables ledger assets (e.g., a sidechain could settle an arrangement using the Bitcoin blockchain to transfer digital assets representing real or virtual assets) to be transferred between multiple blockchains. In some examples, when a user wants to transfer a virtual asset, the user broadcasts a message in real-time to the distributed ledger system (peer-to-peer network). The message is public and can reflect the transfer of assets right away, but usually users can wait for miners to verify the transaction, before relying on the transaction as valid.

In some implementations, authentication can include determining whether ground-truth information is valid based on a blockchain, before comparing the ground-truth information to current information. For example, and as described above, a current voice pattern can be compared to a known voice pattern as part of user authentication. In some examples, before the comparison is conducted, the known voice pattern (e.g., retrieved from a datastore of the service provider) is validated by querying the distributed ledger system. Validation can include a response from the distributed ledger system indicating that the known voice pattern is identical to a copy of the known voice pattern stored in a blockchain managed by the distributed ledger system. In this manner, it is confirmed that the integrity of the known voice pattern is intact. As another example, and as described above, a current behavior pattern can be compared to a known behavior pattern as part of user authentication. In some examples, before the comparison is conducted, the known behavior pattern (e.g., retrieved from a datastore of the service provider) is validated by querying the distributed ledger system. Validation can include a response from the distributed ledger system indicating that the known behavior pattern is identical to a copy of the known behavior pattern stored in a blockchain managed by the distributed ledger system. In this manner, it is confirmed that the integrity of the known behavior pattern is intact.

Figure 2:
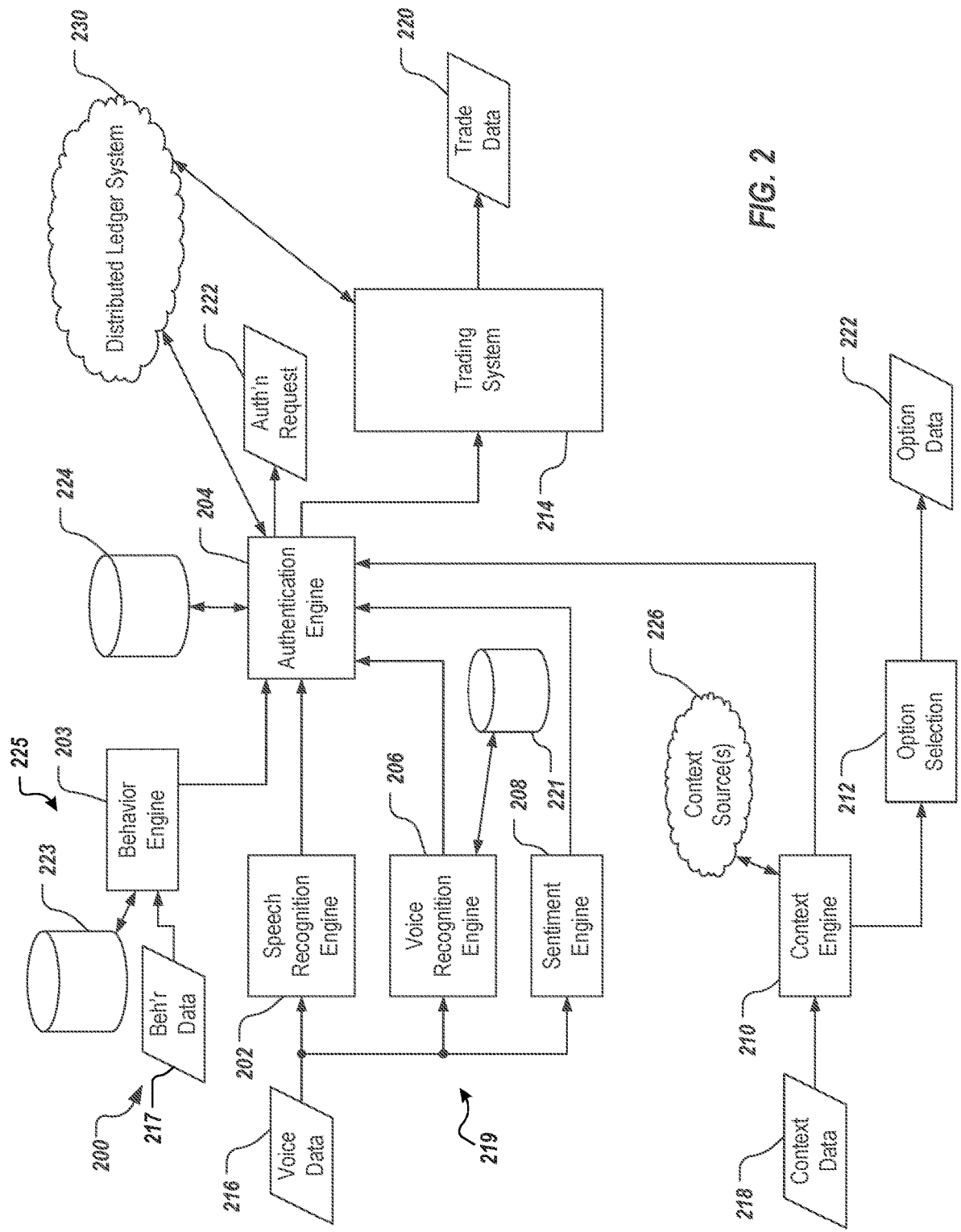
FIG. 2 depicts an example architecture that can be used to execute implementations of the present disclosure.

FIG. 2 depicts an example architecture 200 that can be used to execute implementations of the present disclosure. The example architecture 200 includes a speech recognition engine 202, an authentication engine 204, a voice recognition engine 206, a sentiment engine 208, a context engine 210, an option selection component 212, and a trading system 214. In some examples, each of the recognition engine 202, the authentication engine 204, the voice recognition engine 206, the sentiment engine 208, the context engine 210, the option selection component 212, and the trading system 214 can be provided as one or more computer-executable programs executed by at least one computing device (e.g., the server-side system 106 of FIG. 1).

In the depicted example, voice data 216 is provided. In some examples, the voice data 216 is provided from a client-side device (e.g., smartphone, telephone), as described herein. In the depicted example, behavior data 217 is provided. In some examples, behavior data 217, or at least a portion thereof, is provided from a computing device used by the user interacting with the example architecture 200 (e.g., identifier of the device, location of the user). In the depicted example, context data 218 is provided. In some examples, the context data 218 is provided from at least one context source (e.g., private context source, public context source, the client-side device), as described herein. In some examples, at least a portion of the behavior data 217 can include at least a portion of the context data 218.

In the depicted example, the trading system 214 selectively provides trade data 220 in response to a user request to execute a trade of a financial instrument. In some examples, the trade data 220 is provided as a computer-readable file and includes a type of trade (e.g., buy, sell), a type of a financial instrument to be traded (e.g., stock, bond), a company underlying a stock, for example, an amount of shares to be traded, a price (or range of prices) the shares are to be traded at, a time/date that the trade is to be executed, and/or any other appropriate data. In some examples, the trade data 220 is transmitted (e.g., over a network) to a market, which handles the particular financial instrument to be traded, and executes the trade based on the trade data.

In some examples, the speech recognition engine 202 receives the voice data 216, and processes the voice data to recognize the content of what is spoken. For example, the speech recognition engine 202 process the voice data 216 to generate a data file that includes a text string (e.g., 1234ABCD). The speech recognition engine 202 provides the data file to the authentication engine 204, which performs user authentication at least partially based on the contents of the data file, as described herein. In some examples, the data file is also provided to the behavior engine 203.

In some examples, the voice recognition engine 206 receives the voice data 216, and processes the voice data 216 to provide a current voice pattern. In some examples, the voice recognition engine 206 performs voice recognition to determine whether the user is who the user purports to be. For example, the voice recognition engine 206 compares a current voice vector, based on the current voice pattern, to a known voice vector, as described herein. In some examples, the voice recognition engine 206 retrieves the known voice vector (or pattern) from a repository 221 of known voice vectors. In some examples, the voice recognition engine 206 checks the integrity of the retrieved known voice vector by querying a distributed ledger system 230, as described herein, before conducting the comparison. In some examples, the voice recognition engine 206 provides a data file to the authentication engine 204, which uses the data file to authenticate the user. In some examples, the data file includes value (e.g., ranging from −1 to 1) indicating a similarity between the vectors.

In some examples, the voice recognition engine 206 does not perform the comparison, and, instead, the authentication engine 204 performs the comparison. For example, the voice recognition engine 206 processes the voice data 216 to generate a data file that includes a voice spectrogram, and/or a multi-dimensional vector representative of the voice spectrogram. In some examples, the voice recognition engine 206 provides the data file to the authentication engine 204, which performs user authentication at least partially based on the contents of the data file, as described herein.

In some implementations, the sentiment engine 208 processes the voice data to determine a sentiment, as described herein. In some examples, the sentiment engine 208 provides a data file including the sentiment, and provides the data file to the authentication engine 204, which performs user authentication at least partially based on the contents of the data file, as described herein. In some examples, the sentiment (data file) is provided to the behavior engine 203, as sentiment can be a feature of a behavior pattern, as described herein.

In some examples, the behavior engine 203 receives the behavior data 217, and processes the behavior data 217 to provide a current behavior pattern. In some examples, the behavior engine 203 performs behavior analysis to determine whether the user is who the user purports to be. For example, the behavior engine 203 compares a current behavior vector, based on the current behavior pattern, to a known behavior vector, as described herein. In some examples, the behavior engine 203 retrieves the known behavior vector (or pattern) from a repository 223 of known behavior vectors. In some examples, the behavior engine 203 checks the integrity of the retrieved known behavior vector by querying the distributed ledger system 230, as described herein, before conducting the comparison. In some examples, the behavior engine 203 provides a data file to the authentication engine 204, which uses the data file to authenticate the user. In some examples, the data file includes value (e.g., ranging from −1 to 1) indicating a similarity between the vectors. In some examples, the behavior engine 203 does not perform the comparison, and, instead, the authentication engine 204 performs the comparison. For example, the behavior engine 203 processes the behavior data 217 to generate a data file that includes a current behavior pattern (or vector). In some examples, the behavior engine 203 provides the data file to the authentication engine 204, which performs user authentication at least partially based on the contents of the data file, as described herein.

In some implementations, the context engine 210 processes the context data 218 to provide context to the authentication engine 204, which can be used during authentication of the user, as described herein. In some examples, at least a portion of the context data 218 is provided from one or more context sources 226 (e.g., public, private). In some examples, the context engine 210 queries the one or more context sources 226, as described herein. In some examples, at least a portion of the context data 218 is provided from the computing device the user is using (e.g., as metadata of the voice data 216).

In some implementations, the option selection component 212 adapts options that are available to the user, as described herein, based on context provided from the context engine 210. In some examples, the option selection component 212 provides option data 222, which can be used to modify options that are available to the user (e.g., the option data 222 defines voice prompts to the user indicating user selections that can be made).

In some implementations, the authentication engine 204 authenticates the user based on data received from other components of the example architecture 200. In some examples, the authentication engine 204 retrieves authentication data (e.g., ground-truths, known vectors (patterns)) from a repository 224. In some examples, the authentication engine 204 confirms the integrity of the retrieved authentication data by querying the distributed ledger system 230, as described herein. In some implementations, the authentication engine 204 determines the authentication score, and/or one or more sub-scores, and authenticates the user based thereon, as described herein. In some examples, if the user is determined to be authentic, the user is able to interact with the trading system 214 to conduct one or more trades. In some examples, if the user is (at least initially) not determined to be authentic, a second-level authentication request 222 can be issued. For example, the user can be asked to provide further authentication information (e.g., username, password, PIN).

Figure 3:
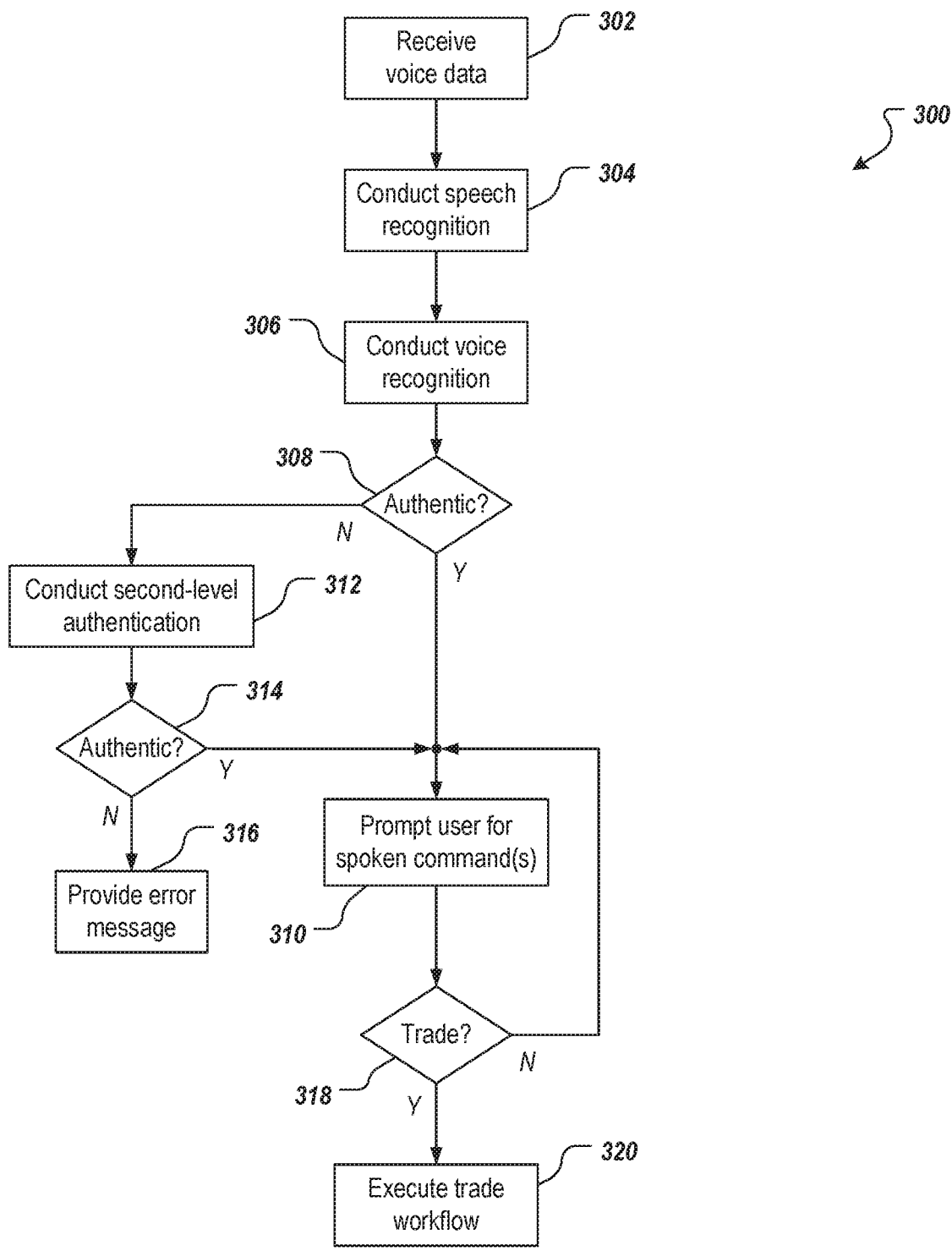
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the example environment 100 of FIG. 1. In some examples, the example process 300 can be provided by one or more computer-executable programs executed using one or more computing devices. For example, the example process 300, or portions thereof, can be provided by one or more programs executed by one or more computing devices.

Voice data is received (302). For example, the user 120 can call into the server-side system 106 using the client-side device 102, and can speak into the client-side device 102 to provide the voice data. In some examples, the server-side system 106 can audibly prompt the user for information (e.g., "Please state your name and account number."). In response to an audible prompt, the user 120 can speak into the client-side device 102 (e.g., "Joe Cool, account number 1234ABCD."), which speech is converted to voice data that is transmitted to the server-side system 106. Speech recognition is conducted (304). For example, the server-side system 106 processes the voice data to recognize the content of the speech, and provide, for example, a data file (e.g., containing one or more text strings). Voice recognition is conducted (306). For example, the server-side system 106 processes the voice data to recognize the voice of the speaker, and provide, for example, a data indicating an identity of the speaker (e.g., the user 120).

It is determined whether the user is authentic (308). For example, the server-side system can use the speech recognition, and the voice recognition to determine whether the user is authentic, as described herein. In some examples, and as described herein, the user can be authenticated further based on a sentiment, a behavior, and a context. If the user is determined to be authentic, the user is prompted for one or more spoken commands (310). If the user is determined not to be authentic, a second-level of authentication can be conducted (312). For example, the server-side system 106 audibly prompts the user to provide authentication data (e.g., username, password, PIN). In some examples, the server-side system 106 prompts the user to speak the authentication data, and speech recognition and/or voice recognition are conducted on the speech to authenticate the user. In some examples, the server-side system 106 prompts the user to provide the authentication data using another channel. For example, the user can be prompted to input a PIN using a keypad of the client-side computing device 102. As another example, the user can be prompted to input credentials (e.g., username, password) and/or a PIN through a mobile application executed on the client-side computing device 102.

It is determined whether the user is authentic (308). For example, the server-side system can use the authentication data to determine whether the user is authentic, as described herein. If the user is determined not to be authentic, an error message can be provided (316). For example, the server-side system 106 can audibly convey to the user that the user cannot be authenticated. In some examples, the server-side system 106 can connect the user 106 with a human (e.g., a customer service representative (CSR)).

If the user is determined to be authentic, the user is prompted for one or more spoken commands (310). For example, the server-side system 310 can audibly prompt the user to select a command from a menu of commands. In some examples, the menu of commands is based on a workflow. In some examples, the workflow defines a series of actions that can be conducted to affect an outcome. In some examples, the workflow can be provided as a default workflow that provides the user with a broad range of options for interacting with the server-side system 106. In some examples, the workflow can be provided as an activity-specific workflow (e.g., a trade workflow) that provides the user with a narrower range of options (e.g., relative to the default workflow) for interacting with the server-side system 106. In some examples, the server-side system 106 processes context data and/or behavior data to determine which workflow the menu of commands is to be based on, as described herein. In some examples, the server-side system 106 processes context data and/or behavior data to determine a specific command to suggest to the user, as described herein (e.g., "Would you like to trade shares of XYZ today?").

It is determined whether the user is initiating a trade of a financial instrument (318). For example, the server-side system 106 can determine whether the user would like to trade a financial instrument based on a spoken command received from the user, the behavior data, and/or the context data. If the user is not initiating a trade of a financial instrument, the process 300 loops back (e.g., non-trade related interactions with the server-side system 106 are performed). If the user is initiating a trade of a financial instrument, a trade workflow is executed (320). For example, the user verbally interacts with the server-side system 106 to provide trade information (e.g., type of shares, quantity of shares, buy/sell), which is used to execute the trade, as described herein.

Figure 4:
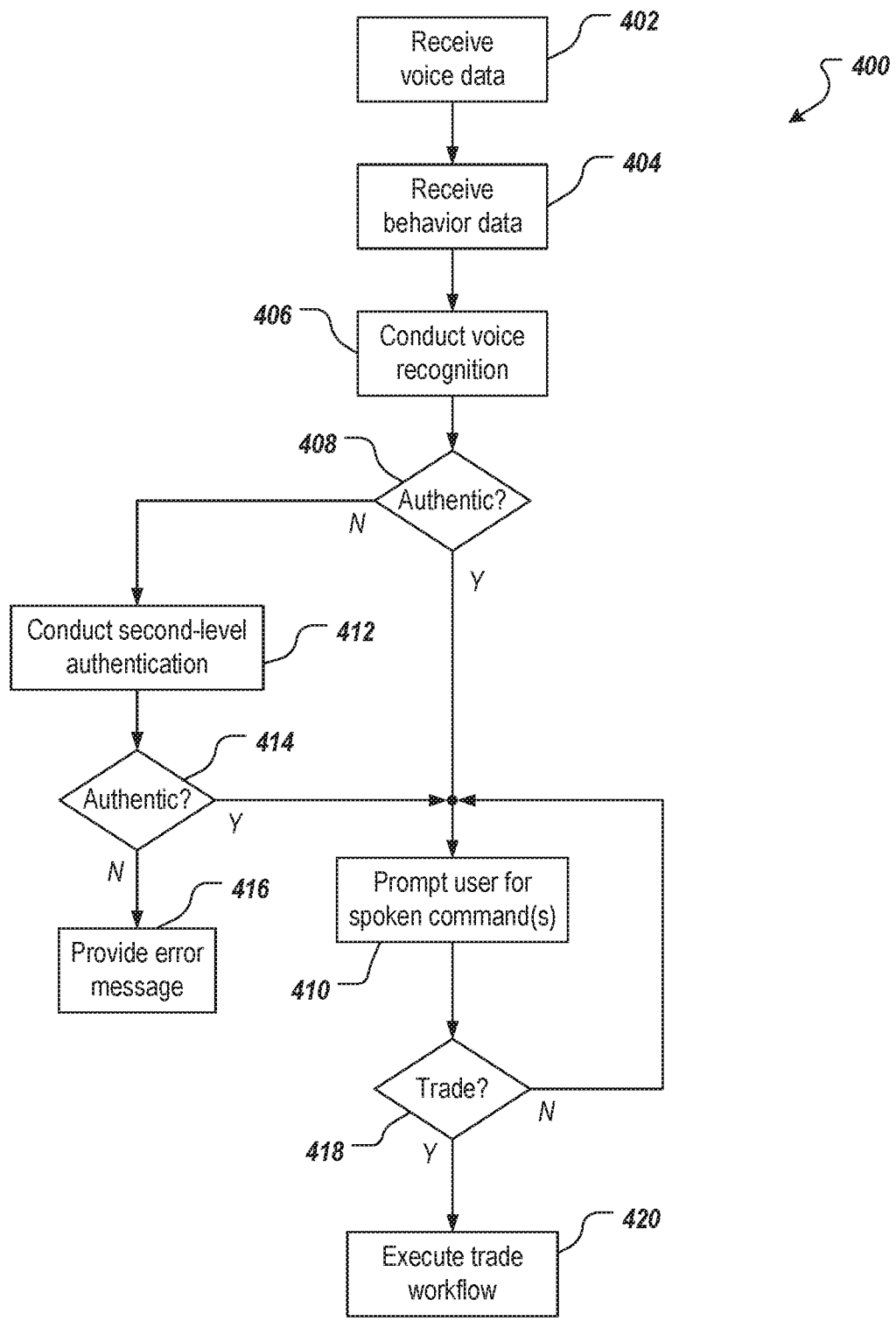
FIG. 4 depicts an example process that can be executed in accordance with implementations of the present disclosure.

FIG. 4 depicts an example process 400 that can be executed in accordance with implementations of the present disclosure. The example process 400 can be implemented, for example, by the example environment 100 of FIG. 1. In some examples, the example process 400 can be provided by one or more computer-executable programs executed using one or more computing devices. For example, the example process 400, or portions thereof, can be provided by one or more programs executed by one or more computing devices.

Voice data is received (402). For example, the user 120 can call into the server-side system 106 using the client-side device 102, and can speak into the client-side device 102 to provide the voice data. In some examples, the server-side system 106 can audibly prompt the user for information (e.g., "Please state your name and account number."). In response to an audible prompt, the user 120 can speak into the client-side device 102 (e.g., "Joe Cool, account number 1234ABCD."), which speech is converted to voice data that is transmitted to the server-side system 106. Behavior data and/or context data are received (404). For example, the server-side system 106 can receive behavior data and/or context data from one or more sources (e.g., the client-side device 102, public context source(s), private context source(s)). Voice recognition is conducted (406). For example, the server-side system 106 processes the voice data to recognize the voice of the speaker, and provide, for example, a data indicating an identity of the speaker (e.g., the user 120).

It is determined whether the user is authentic (308). For example, the server-side system can use the voice recognition, behavior analysis, and/or context analysis to determine whether the user is authentic, as described herein. In some examples, and as described herein, the user can be authenticated further based on speech recognition, and/or a sentiment. If the user is determined to be authentic, the user is prompted for one or more spoken commands (410). If the user is determined not to be authentic, a second-level of authentication can be conducted (412). For example, the server-side system 106 audibly prompts the user to provide authentication data (e.g., username, password, PIN). In some examples, the server-side system 106 prompts the user to speak the authentication data, and speech recognition and/or voice recognition are conducted on the speech to authenticate the user. In some examples, the server-side system 106 prompts the user to provide the authentication data using another channel. For example, the user can be prompted to input a PIN using a keypad of the client-side computing device 102. As another example, the user can be prompted to input credentials (e.g., username, password) and/or a PIN through a mobile application executed on the client-side computing device 102.

It is determined whether the user is authentic (408). For example, the server-side system can use the authentication data to determine whether the user is authentic, as described herein. If the user is determined not to be authentic, an error message can be provided (416). For example, the server-side system 106 can audibly convey to the user that the user cannot be authenticated. In some examples, the server-side system 106 can connect the user 106 with a human (e.g., a customer service representative (CSR)).

If the user is determined to be authentic, the user is prompted for one or more spoken commands (410). For example, the server-side system 106 can audibly prompt the user to select a command from a menu of commands. In some examples, the menu of commands is based on a workflow. In some examples, the workflow defines a series of actions that can be conducted to affect an outcome. In some examples, the workflow can be provided as a default workflow that provides the user with a broad range of options for interacting with the server-side system 106. In some examples, the workflow can be provided as an activity-specific workflow (e.g., a trade workflow) that provides the user with a narrower range of options (e.g., relative to the default workflow) for interacting with the server-side system 106. In some examples, the server-side system 106 processes context data and/or behavior data to determine which workflow the menu of commands is to be based on, as described herein. In some examples, the server-side system 106 processes context data and/or behavior data to determine a specific command to suggest to the user, as described herein (e.g., "Would you like to trade shares of XYZ today?").

It is determined whether the user is initiating a trade of a financial instrument (418). For example, the server-side system 106 can determine whether the user would like to trade a financial instrument based on a spoken command received from the user, the behavior data, and/or the context data. If the user is not initiating a trade of a financial instrument, the process 400 loops back (e.g., non-trade related interactions with the server-side system 106 are performed). If the user is initiating a trade of a financial instrument, a trade workflow is executed (420). For example, the user verbally interacts with the server-side system 106 to provide trade information (e.g., type of shares, quantity of shares, buy/sell), which is used to execute the trade, as described herein.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
    receiving, by the one or more processors, first voice data from a user;
    generating, by the one or more processors, a first vector of a current voice pattern of the user based on the first voice data;
    receiving, by the one or more processors, behavior data associated with the user;
    generating, by the one or more processors, a second vector of a current behavior pattern of the user based on the behavior data;
    comparing a first dot product of the first vector of the current voice pattern from the user and a third vector of a known voice pattern of the user to a first threshold value to provide a first comparison result;
    performing behavior analysis of the behavior data by comparing a second dot product of the second vector of the current behavior pattern of the user and a fourth vector of a known behavior pattern of the user to a second threshold value to provide a second comparison result; and
    determining, by the one or more processors, that the user is authentic at least partially based on the first comparison result and the second comparison result; and
    after determining that the user is authentic:
        prompting, via a graphical user interface (GUI), one or more spoken commands from the user, wherein the one or more spoken commands is based on an activity-specific workflow;
        receiving, by the one or more processors, second voice data of the one or more spoken commands of the user to initiate a trade of at least one financial instrument;
        determining, by the one or more processors, that the user is authentic by comparing the second voice data to known voice data of the user and that the second dot product exceeds the second threshold value;
        in response to determining that the user is authentic, providing, by the one or more processors, trade data for executing the trade of the at least one financial instrument, and
        executing the trade, where the trade is based on the activity-specific workflow.

2. The method of claim 1, wherein determining that the user is authentic further comprises determining that at least one feature of the second vector of the current behavior pattern corresponds to context data associated with the user when the second dot product is less than or equal to the second threshold value.

3. The method of claim 1, further comprising receiving context data of a context associated with one or more of the first voice data and the second voice data, the context data being provided from one or more of a public context source, a private context source, and a device being used by the user.

4. The method of claim 3, wherein each of the public context source and the private context source comprises one of a computer-implemented search service, a computer-implemented stock quoting service, and a computer-implemented social networking service.

5. The method of claim 1, wherein determining that the user is authentic comprises determining that a sentiment of the user corresponds to an alert sentiment, and in response, determining that the user is authentic based on an additional level of authentication.

6. The method of claim 5, wherein the additional level of authentication comprises prompting the user for authentication data, the user being authenticated based on the authentication data.

7. A system comprising:
    a data store for storing data; and
    at least one processor configured to interact with the data store, the at least one processor being further configured to execute computer-readable instructions to perform operations comprising:
        receiving first voice data from a user;
        generating a first vector of a current voice pattern of the user based on the first voice data;
        receiving behavior data associated with the user;
        generating a second vector of a current behavior pattern of the user based on the behavior data;
        comparing a first dot product of the first vector of the current voice pattern of the user and a third vector of a known voice pattern of the user to a first threshold value to provide a first comparison result;
        performing behavior analysis of the behavior data by comparing a second dot product of the second vector of the current behavior pattern of the user and a fourth vector of a known behavior pattern of the user to a second threshold value to provide a second comparison result; and
        determining that the user is authentic at least partially based on the first comparison result and the second comparison result; and
        after determining that the user is authentic:
            prompting, via a graphical user interface (GUI) one or more spoken commands from the user, wherein the one or more spoken commands is based on an activity-specific workflow;
            receiving second voice data of the one or more spoken commands of the user to initiate a trade of at least one financial instrument;
            determining that the user is authentic by comparing the second voice data to known voice data of the user and that the second dot product exceeds the second threshold value;
            in response to determining that the user is authentic, providing, trade data for executing the trade of the at least one financial instrument; and
            executing the trade, where the trade is based on the activity-specific workflow.

8. The system of claim 7, wherein determining that the user is authentic further comprises determining that at least one feature of the second vector of the current behavior pattern corresponds to context data associated with the user when the second dot product is less than or equal to the second threshold value.

9. The system of claim 7, wherein the operations further comprise receiving context data of a context associated with one or more of the first voice data and the second voice data, the context data being provided from one or more of a public context source, a private context source, and a device being used by the user.

10. The system of claim 9, wherein each of the public context source and the private context source comprises one of a computer-implemented search service, a computer-implemented stock quoting service, and a computer-implemented social networking service.

11. The system of claim 7, wherein determining that the user is authentic comprises determining that a sentiment of the user corresponds to an alert sentiment, and in response, determining that the user is authentic based on an additional level of authentication.

12. The system of claim 11, wherein the additional level of authentication comprises prompting the user for authentication data, the user being authenticated based on the authentication data.

13. A non-transitory computer readable medium storing instructions that, when executed by at least one processor, cause the at least one processor to perform operations comprising:
   receiving first voice data from a user;
   generating a first vector of a current voice pattern of the user based on the first voice data;
   receiving behavior data associated with the user;
   generating a second vector of a current behavior pattern of the user based on the behavior data;
   comparing a first dot product of the first vector of the current voice pattern of the user and a third vector of a known voice pattern of the user to a first threshold value to provide a first comparison result;
   performing behavior analysis of the behavior data by comparing a second dot product of the second vector of the current behavior pattern of the user and a fourth vector of a known behavior pattern of the user to a second threshold value to provide a second comparison result; and
   determining that the user is authentic at least partially based on the first comparison result and the second comparison result; and
   after determining that the user is authentic:
      prompting, via a graphical user interface (GUI), one or more spoken commands from the user, wherein the one or more spoken commands is based on an activity for an activity-specific workflow;
      receiving second voice data of the one or more spoken commands of the user to initiate a trade of at least one financial instrument;
      determining that the user is authentic by comparing the second voice data to known voice data of the user and that the second dot product exceeds the second threshold value;
      in response to determining that the user is authentic, providing trade data for executing the trade of the at least one financial instrument, and
      executing the trade, wherein the trade is based on the activity-specific workflow.

14. The computer readable medium of claim 13, wherein determining that the user is authentic further comprises determining that at least one feature of the second vector of the current behavior pattern corresponds to context data associated with the user when the second dot product is less than or equal to the second threshold value.

15. The computer readable medium of claim 13, wherein the operations further comprise receiving context data of a context associated with one or more of the first voice data and the second voice data, the context data being provided from one or more of a public context source, a private context source, and a device being used by the user.

16. The computer readable medium of claim 15, wherein each of the public context source and the private context source comprises one of a computer-implemented search service, a computer-implemented stock quoting service, and a computer-implemented social networking service.

17. The computer readable medium of claim 13, wherein determining that the user is authentic comprises determining that a sentiment of the user corresponds to an alert sentiment, and in response, determining that the user is authentic based on an additional level of authentication.

* * * * *

UNITED STATES PATENT AND TRADEMARK OFFICE
CERTIFICATE OF CORRECTION

PATENT NO. : 11,341,573 B1
APPLICATION NO. : 15/421152
DATED : May 24, 2022
INVENTOR(S) : Fiedler et al.

It is certified that error appears in the above-identified patent and that said Letters Patent is hereby corrected as shown below:

On the Title Page

In the illustrative figure "222 Auth'n Request" should read -- 223 Auth'n Request --.

In the Drawings

Sheet 2 of 4, Figure 2, replace "222 Auth'n Request" with -- 223 Auth'n Request --, therefor.

In the Specification

In Column 13, Line 2, delete "patter)" and insert -- pattern) --, therefor.

In Column 13, Line 5, delete "authenticate." and insert -- authenticated. --, therefor.

In Column 15, Line 54, delete "example" and insert -- example of --, therefor.

In Column 19, Line 25, delete "222 can" and insert -- 223 can --, therefor.

In Column 20, Line 17, delete "user 106" and insert -- user --, therefor.

In Column 20, Line 21, delete "system 310" and insert -- system --, therefor.

In Column 24, Line 24, delete "to" and insert -- with --, therefor.

Signed and Sealed this
Twenty-third Day of August, 2022

Katherine Kelly Vidal
*Director of the United States Patent and Trademark Office*